United States Patent [19]
Dodson, III

[11] Patent Number: 5,847,549
[45] Date of Patent: Dec. 8, 1998

[54] POWER CONVERTER STABILIZATION LOOP

[75] Inventor: George B. Dodson, III, Glendale, Calif.

[73] Assignee: Pairgain Technologies, Inc., Tustin, Calif.

[21] Appl. No.: 915,510

[22] Filed: Aug. 13, 1997

Related U.S. Application Data

[63] Continuation of Ser. No. 752,673, Nov. 19, 1996, abandoned.

[51] Int. Cl.$^6$ ............................................. G05F 1/10
[52] U.S. Cl. ........................... 323/220; 323/299; 323/901; 363/21
[58] Field of Search ..................... 323/222, 266, 323/271, 272, 282, 901, 220, 299; 307/52, 60; 363/28, 84, 88, 124, 127, 21

[56] References Cited

U.S. PATENT DOCUMENTS

| | | | |
|---|---|---|---|
| 3,938,025 | 2/1976 | Gustafsson | 321/2 |
| 4,210,958 | 7/1980 | Ikenoue et al. | 363/124 |
| 4,253,139 | 2/1981 | Weiss | 363/95 |
| 4,309,748 | 1/1982 | Forro et al. | 363/65 |
| 4,450,516 | 5/1984 | Gerard | 363/84 |
| 4,504,898 | 3/1985 | Pilukaitis et al. | 323/285 |
| 4,626,766 | 12/1986 | Musil | 323/222 |
| 4,899,269 | 2/1990 | Rouzies | 363/41 |
| 5,177,431 | 1/1993 | Smith et al. | 323/349 |
| 5,222,015 | 6/1993 | Nakagawa | 363/21 |
| 5,268,832 | 12/1993 | Kandatsu | 363/95 |
| 5,394,025 | 2/1995 | Pierson | 327/530 |
| 5,438,505 | 8/1995 | Cohen | 363/95 |
| 5,479,090 | 12/1995 | Schultz | 323/284 |
| 5,490,055 | 2/1996 | Boylan et al. | 363/41 |
| 5,493,204 | 2/1996 | Caldwell | 323/299 |
| 5,604,352 | 2/1997 | Scheetz | 363/61 |

Primary Examiner—Stuart N. Hecker
Attorney, Agent, or Firm—D'Alessandro & Ritchie

[57] ABSTRACT

The invention provides a stabilized power converter having an input voltage and an output voltage, where the stabilized converter operates similar to a conventional converter under normal conditions, and operates continuously at the maximum power transfer point during overload conditions. The stabilized converter comprises a voltage control loop for regulating output voltage, and a stabilization loop for regulating input voltage. In a preferred embodiment, the stabilization loop senses the input voltage to the stabilized converter and compares it to a reference voltage. Whenever converter input voltage is above the maximum power transfer voltage, no action is taken by the stabilization loop, and the converter operates in the conventional manner. As converter input voltage approaches the maximum power transfer voltage, converter output voltage and corresponding converter input and output power are reduced to compensate.

7 Claims, 2 Drawing Sheets

POWER CONVERTER STABILIZATION LOOP

CROSS-REFERENCE TO RELATED APPLICATION

This is a file-wrapper continuation of patent application Ser. No. 08/752,673, filed Nov. 19, 1996 now abandoned.

BACKGROUND OF THE INVENTION

1. Field of the Invention

The present invention relates to telephone systems having power conversion subsystems for delivering power to remote terminals.

2. Prior Art

A number of applications exist where it is desirable to provide power to remote locations over long electrical lines. One such application is line powered telephone communication systems where it is desirable to provide power for operating remote terminals over the same lines which handle the communication signals.

In a conventional line powered system, interconnecting transmission lines radiate outward from the "Central Office" location to remote locations at various distances. At long distances, line resistance limits the amount of power available to relatively modest values. As line loss is proportional to resistance and the square of current, it is, of course, desirable to minimize both. However, line resistance is generally constant with respect to length and cannot be reduced. The use of multiple parallel lines in place of a single line to reduce resistance reduces the number of separate pairs available, and is also undesirable. Likewise, the line current can be reduced by increasing line voltage, but the extent to which voltage can be increased is limited by safety regulations.

Further restrictions in power transfer arise from the fact that as the load on the line is increased, a point is eventually reached at which the power transferred to the load becomes a maximum and additional increases in line current actually result in less power being transferred to the load. This situation occurs when load resistance equals line resistance, or when load voltage equals one half of the source voltage applied to the input of the line.

For optimum performance, a system should never exceed the maximum power transfer point of its particular power transfer curve. Under situations of power demand exceeding the maximum available power, operation at the maximum power transfer point would be desirable; however, this is an unstable operating point for conventional power converters.

A conventional power converter increases its input current in response to increasing power demands upon its output. If the conventional converter is operating at an input current below the maximum power transfer current, an increase in input current will result in an increase in input power to the converter, and the operation is stable. If the conventional converter is operating at a current at, or above, the maximum power transfer current, an increase in input current will result in a decrease in input power to the converter, and the operation is unstable.

Under these conditions, a conventional power converter will continue to increase its input current and overload the line, causing a system crash. This results in an interruption of service to the entire system, which is, of course, undesirable.

To avoid such a consequence, conventional power converters must be operated well below the maximum power transfer point of the power transfer curve resulting in significantly less power being available to the remote equipment under heavy demand situations. This is less optimum than is possible.

In order to recover from a system crash, or whenever system power is temporarily removed, the system must restart. A conventional converter must not begin operation before the line input voltage rises above the maximum power transfer point, or unstable operation will force the system to crash again, preventing restarting. This is, of course, also undesirable.

Accordingly, it would be advantageous to provide an improved system and method of power conversion which can operate at the maximum power transfer point under conditions of heavy demand and which prevents power system crashes.

SUMMARY OF THE INVENTION

The invention provides a stabilized power converter having an input voltage and an output voltage, where the stabilized converter operates similar to a conventional converter under normal conditions, and operates continuously at the maximum power transfer point during overload conditions. The stabilized converter comprises a voltage control loop for regulating output voltage, and a stabilization loop for regulating input voltage. In a preferred embodiment, the stabilization loop senses the input voltage to the stabilized converter and compares it to a reference voltage. Whenever converter input voltage is above the maximum power transfer voltage, no action is taken by the stabilization loop, and the converter operates in the conventional manner. As converter input voltage approaches the maximum power transfer voltage, converter output voltage and corresponding converter input and output power are reduced to compensate.

DESCRIPTION OF THE PREFERRED EMBODIMENTS

Figure 1:
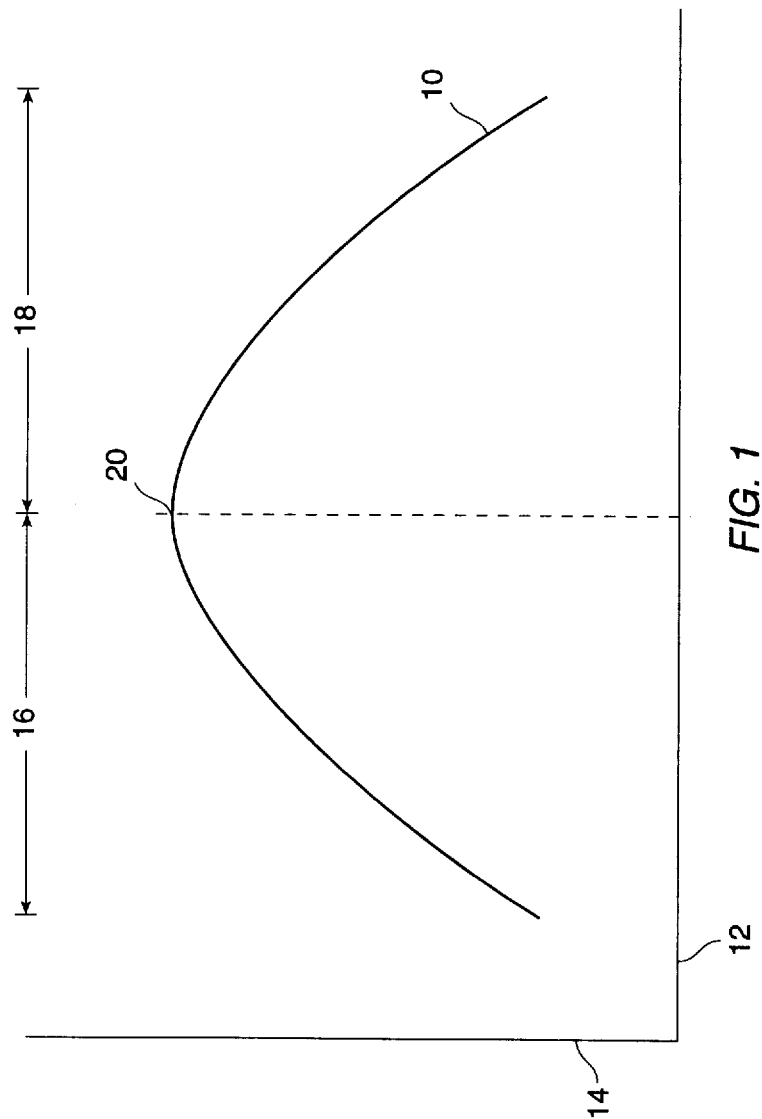
FIG. 1 is a graph of a power transfer curve.

Turning to FIG. 1, a power transfer curve 10 is shown in graphical form. Curve 10 is only a general representation of one possible power transfer curve. The horizontal axis 12 of the graph represents the line current and is measured in units of amperes. The vertical axis 14 of the graph represents power transfer rate and is measured in units of watts.

For reference purposes, curve 10 is divided into two parts. The top of curve 10 is the maximum power transfer point 20. The portion of curve 10 to the left of the maximum power transfer point 20 is designated region 16. The portion of curve 10 to the right of the maximum power transfer point 20 is designated region 18. For optimum performance, a system should be able to operate at the maximum power transfer point 20.

Figure 2:
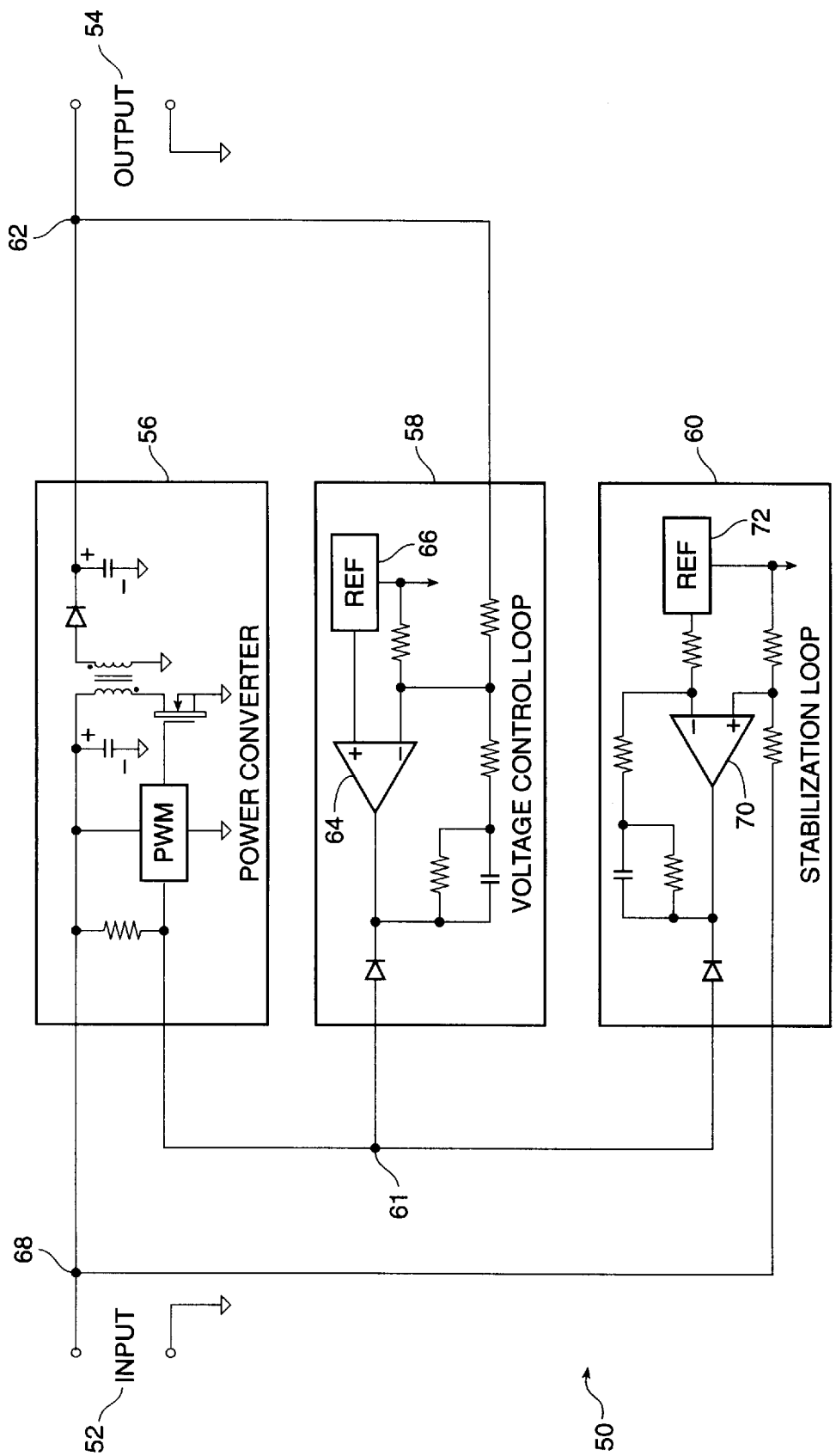
FIG. 2 is a block diagram of a stabilized power converter.

Turning now to FIG. 2, a stabilized power converter 50 according to the present invention is shown. The stabilized power converter 50 is electrically coupled in series with an electrical transmission line (not shown) which is disposed for providing power to a remote location. The stabilized power converter 50 has an input 52 and an output 54 and comprises a power converter 56, a voltage control loop 58, and a stabilization loop 60.

The power converter 56 and the voltage control loop 58 can be of a conventional design known to one of ordinary skill in the art. The power converter 56 and the voltage control loop 58 function to maintain the voltage at the output 54 at a regulated value despite fluctuations in the voltage at the input 52. The power converter 56 is responsive to a control input signal from the voltage control loop 58 at control input node 61.

In a preferred embodiment, the voltage control loop 58 monitors the voltage at the output 54 of the stabilized power converter 50 at an output node 62. The voltage value at output node 62 is coupled to an input of an amplifier 64. The amplifier 64 compares the voltage value at output node 62 against a selectable reference voltage 66. In a preferred embodiment, this reference voltage 66 is set by the designer of the stabilized power converter 50.

Three possible conditions exist: first the voltage value at the output node 62 could be less than the reference voltage 66, second the voltage value at the output node 62 could be greater than the reference voltage 66, or third the voltage value at the output node 62 could be equal to the reference voltage 66. If the voltage value at output node 62 is less than the reference voltage 66, then the amplifier 64 sends a control input signal to control input node 61 of the power converter 56 demanding more input current. This continues until the voltage value at output node 62 is equal to the reference voltage 66 at which point the amplifier 64 stabilizes. If the voltage value at output node 62 is greater than the reference voltage 66, then the amplifier 64 sends a control input signal to control input node 61 demanding less input current. This continues until the voltage value at output node 62 is equal to the reference voltage 66 at which point the amplifier 64 stabilizes. If the voltage value at output node 62 is equal to the reference voltage 66, then the amplifier 64 is in an equilibrium state and does not demand a change in input current.

The reference voltage 66 is selected such that the voltage control loop 58 maintains operation of the stabilized power converter output voltage at the desired value under normal operating conditions.

A preferred embodiment of a stabilization loop 60 is shown in FIG. 2. The stabilization loop 60 monitors the voltage at the input 52 of the stabilized power converter 50 at an input node 68. The voltage value at input node 68 is coupled to an amplifier 70. The amplifier 70 compares the voltage value at input node 68 against a selectable reference voltage 72. Reference voltage 72 is selected such that, under overload conditions, stabilization loop 60 maintains operation of the stabilized power converter 50 near the maximum power transfer point 20 on curve 10 of FIG. 1. In alternative embodiments, reference voltage 72 can be selected such that stabilization occurs at voltages above or below the maximum power transfer point 20, although this is generally considered less optimum. In a preferred embodiment, this reference voltage 72 is set by the designer of the stabilized power converter 50.

Although in a preferred embodiment the stabilization loop 60 operates by comparison of the input voltage at the input node 68 with the reference voltage 72, in alternative embodiments, the stabilization loop 60 may be disposed so as to operate by comparison of the input voltage at the input node 68 with the output voltage at the output node 62, or any combination thereof.

Under normal conditions, when the voltage value at input node 68 is above the maximum power transfer voltage; the stabilization loop 60 takes no action and amplifier 70 remains off. Under overload conditions, when the voltage value at input node 68 drops below the maximum power transfer voltage, amplifier 70 overrides the output of the voltage control loop amplifier 64 at control input node 61 decreasing the demand for input current. Amplifier 70 continues to reduce input current demand until the voltage at input node 68 rises back up to the maximum power transfer voltage.

Recall that for the conventional power converter, an increase in load at the power converter output, when operating at the maximum power transfer point 20 of FIG. 1, results in an increase in current demand which causes the operating point to move into region 18 of FIG. 1, away from the maximum power transfer point 20. A conventional power converter will therefore force itself to crash under these conditions.

In the present invention, the reference voltage 72 is selected such that the stabilization loop 60 maintains operation of the stabilized power converter 50 near the maximum power transfer point 20 on curve 10 of FIG. 1. This is accomplished by preventing the power converter 56 from drawing more and more current when operating in region 18 of FIG. 1, which would result in a self induced crash.

However, in alternative embodiments, the stabilization circuit 60 may be disposed, and the reference voltage 72 selected, so as to cause the stabilized power converter 50 to operate at any selected point or region of the power transfer curve 10 of FIG. 1, whether specifically to the left of, or specifically to the right of, the maximum power transfer point 20 of FIG. 1.

Recall also that in order to recover from a system crash, the system has to be turned off and restarted again. If at restart the system begins operation in region 18 of FIG. 1, the conventional power converter will force the system to crash again.

In the present invention, under the condition of starting or restarting, the stabilization loop 60 prevents the power converter 56 from starting until the voltage at input 52, as sensed at input node 68, is above the overload stabilization voltage point, thereby avoiding another self induced crash.

Although the present invention is capable of preventing a self induced crash of the power converter, operation, even if stabilized, is not without its consequences. The consequence is that output voltage regulation is lost and service to some of the more remote telephones may be lost. The number of remote telephones to which service may be lost will depend on the total number of telephones being operated off hook or being rung and the distance over which these telephones are located from the remote terminal. However, the number of telephones lost will be fewer than with a conventional power converter which would lose all of its telephone service after a self induced crash. In the present invention, service would be interrupted only at the most distant telephones or when another telephone is ringing rather than a complete loss of service to all telephones.

Alternative Embodiments

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

For a first example, in alternative embodiments the power converter 56 may comprise any type of power converter topology, whether isolated or non-isolated, whether using linear feedback parameters or nonlinear feedback parameters, and including specific power converter topologies such as forward, flyback, boost, buck-boost, Cuk, Sepic, and other known topologies.

For a second example, in alternative embodiments the invention may be used in conjunction with circuitry for providing galvanic isolation between primary and secondary circuits by any of a variety of known techniques, such as by optical coupling, transformer coupling, or other known techniques.

For a third example, in alternative embodiments the invention may be used in a power conversion or power delivery system in conjunction with additional power converter systems according to the invention, in conjunction with other types of power converter systems, or any combination thereof.

For a fourth example, in alternative embodiments the invention, and its principles and techniques, may be used to provide a power conversion system which provides regulated delivery of a selected constant amount of power, a selected constant amount of voltage, a selected constant amount of current, regulated delivery of power using a selected constant amount of resistance, or any combination thereof.

For a fifth example, in alternative embodiments the invention, and its principles and techniques, may be used in conjunction with conventional power conversion systems so as to prevent self induced crashes during system startup of conventional power conversion systems.

What is claimed is:

1. A stabilized power converter, including an input node;

an output node;

a power converter coupled to said input node and to said output node, and having a control input node;

a voltage control circuit coupled to said output node and directly connected to said control input node, said power converter being regulated to provide power at said output node at a selected regulated output voltage; and a stabilization circuit coupled to said input node and directly connected to said control input node, said power converter being regulated to operate at substantially constant input voltage, at a selected voltage operating point of the input node.

2. A stabilized power converter as in claim 1, wherein said voltage control circuit includes a voltage control reference circuit disposed for providing a selected voltage control reference voltage.

3. A stabilized power converter as in claim 1, wherein said stabilization circuit includes a stabilization reference circuit disposed for providing a selected stabilization reference voltage.

4. A stabilized power converter as in claim 1, wherein said stabilization circuit includes a stabilization reference voltage; and a comparator coupled to said input node and to said stabilization reference voltage, and generating a comparator output in response thereto;

wherein said comparator output is coupled to said control input node.

5. A stabilized power converter as in claim 1, wherein said stabilization circuit is operative to reduce a voltage at said control input node in response to a reduction of a voltage at said input node.

6. A method of transmitting stabilized power, said method including the steps of:

operating a power converter, in response to an input control signal, to provide power at an output node in response to an input power source at an input node;

comparing a voltage at said output node with a voltage control reference, and generating a first control signal in response thereto;

comparing a voltage at said input node with a stabilization reference, and generating a second control signal in response thereto;

combining said first control signal and second control signal at a node to generate an input control signal;

said power converter being regulated to provide power at a substantially constant output voltage whenever operating with input voltage at or above a selected input voltage stabilization point; and said power converter being regulated to operate at essentially constant input voltage at a selected operating point, whenever output loading would exceed the maximum power available at the input node.

7. A method as in claim 6, wherein said second control signal is operative to cause said power converter to reduce an input current at said input node in response to a reduction of an input voltage at said input node.

* * * * *